Patented Aug. 21, 1923.

1,465,689

UNITED STATES PATENT OFFICE.

DAVID SEGALLER AND DAVID HENRY PEACOCK, OF HUDDERSFIELD, ENGLAND, ASSIGNORS TO BRITISH DYESTUFFS CORPORATION LIMITED, OF BLACKLEY, MANCHESTER, ENGLAND.

MANUFACTURE OF OXY AND SULPHO-OXY DERIVATIVES OF ANTHRAQUINONE.

No Drawing.     Application filed December 13, 1921. Serial No. 521,997.

*To all whom it may concern:*

Be it known that we, DAVID SEGALLER and DAVID HENRY PEACOCK, residing at Huddersfield, West Riding, England, subjects of the King of Great Britain and Ireland, have invented certain new and useful Improvements in the Manufacture of Oxy and Sulpho-Oxy Derivatives of Anthraquinone, of which the following is a specification.

This invention relates to the manufacture of derivatives of anthraquinone.

In 1874 Baeyer & Caro, Berichte 7, 968 described the condensation of phthalic anhydride with phenol, salicylic acid, and with di-hydroxy benzenes; from the two first named bodies they obtained, besides phenol-phthalein, a mixture of mono-oxy-anthraquinones.

We have found that phthalic anhydride can be condensed with phenol or with a cresol, that is to say with a phenol of the benzene series not exceeding 108 in molecular weight; further, the said phenol may be partly or wholly sulphonated or not, then, as may be desired, 1:hydroxy:4 sulpho acid of anthraquinone, quinizarin or purpurin or methyl derivatives thereof can be obtained as may be desired. The condensation, according to our invention, is effected by using a sulphuric acid solution of boric acid as a condensation agent, whilst maintaining a suitable temperature. At temperatures approximating 200 degrees C. the anthraquinone-oxy-sulphonic acid is obtained, and on further treatment of this body either after isolation or in the sulphuric acid solution in which it is obtained at a temperature of about 240°–250° C. the conversion into 1:4-di-oxy-anthraquinone that is, quinizarin takes place.

The sulphonation of the phenol can be effected in the same operation as this condensation with phthalic anhydride; and the conversion of the anthraquinone-oxy-sulphonic acid, which appears to be first obtained, into the quinizarin can also be effected in one operation, so that this invention affords a simple method of preparing quinizarin in one operation from phenol and phthalic anhydride.

The cresols can be condensed with phthalic anhydride in a similar manner.

The following examples will serve to further illustrate the nature of this invention and the manner in which it is carried into practical effect, but the invention is not confined to the examples:—

*Example I. Anthraquinone-oxy-sulphonic acid.*

Mix together 200 grams 96% sulphuric acid, 40 grams phthalic anhydride, 19 grams boric acid, and 13 grams phenol-*p*-sulphonic acid.

The charge is heated to 180° C. for 4 hours, then slowly taken to 200° C. and kept there for 3 hours. It is then cooled, poured into water, and the oxy-sulphonic acid isolated in the usual way. The condensation can be effected with fuming acid and phenol may be converted to the *p*-sulphonic acid and used without isolation.

*Example II. Quinizarin.*

Anthraquinone-oxy-sulphonic acid is heated with 10 parts of sulphuric acid to 240–250° C. for 3 hours and then cooled, poured into water and the quinizarin filtered off.

The anthraquinone-oxy-sulphonic acid need not be isolated but the mixture obtained in its preparation can be heated to 250° C. with or without the addition of more sulphuric acid and a catalyst such as mercury oxide. The quinizarin is then isolated in the usual way.

If the phenol disulphonic acid be treated as described in the foregoing examples or if starting from phenol itself the sulphonation be carried to the degree that the disulpho acid is obtained before the condensation is effected the final product obtained consists substantially of purpurin that is 1:2:4:hydroxy-anthraquinone.

The following example illustrates the production of quinizarin starting from phenol in one operation:—

*Example III.*

600 parts phthalic anhydride, 94 parts phenol, 280 parts boric acid, 3,000 parts sulphuric acid (containing about 96% $H_2SO_4$) are heated together in a vessel provided with an agitator and reflux condenser for 3 hours at 180° C.; then for 3 hours at 200° C.; and finally for 3 hours at 238–240° C.

When cold the reaction mixture is poured onto ice (6,000-parts) filtered and washed with cold water, the acid filtrate being reserved. The well pressed solid cake is stirred to a paste with 10,000 parts of water, boiled for a few minutes, filtered hot and washed well with boiling water. The quinizarin remains on the filter and is dried. The acid filtrates are worked up for the recovery of the phthalic acid they contain.

What we claim and desire to secure by Letters Patent is:—

1. The manufacture of oxy derivatives of anthraquinone by condensing a phenol of the benzine series not exceeding 108 in molecular weight with phthalic anhydride by heating the mixture in a sulphuric acid solution of boric acid, and heating the resulting product in sulphuric acid solution.

2. The manufacture of quinizarin by condensing phenol with phthalic anhydride by heating these bodies in a sulphuric acid solution of boric acid and further heating the sulphonated product at first obtained.

3. The manufacture of quinizarin by heating a mixture of phthalic anhydride, phenol, boric acid and sulphuric acid in three successive stages at 180° C., 200° C. and 238–240° C. pouring the reaction mixture on ice and separating the quinizarin.

4. The manufacture of quinizarin by heating a mixture of phthalic anhydride, phenol, boric acid and sulphuric acid in three successive stages of three hours each at 180° C., 200° C. and 238°–240° C., pouring the reaction mixture on ice and separating the quinizarin.

5. The manufacture of quinizarin by heating a mixture of phthalic anhydride, phenol, boric acid and sulphuric acid in three successive stages of three hours each at 180° C., 200° C. and 238–240° C., pouring the reaction mixture on ice and separating the quinizarin by filtering off and washing with cold water, pressing, stirring to a paste with water, boiling for a few minutes, filtering hot, washing with boiling water and drying.

In testimony whereof we have signed our names to this specification.

DAVID SEGALLER,
DAVID HENRY PEACOCK.